United States Patent [19]
Cassidy

[11] Patent Number: 5,299,526
[45] Date of Patent: Apr. 5, 1994

[54] INDICATORS

[75] Inventor: Ronald F. Cassidy, Hampshire, United Kingdom

[73] Assignee: Pall Corporation, Glen Cove, N.Y.

[21] Appl. No.: 881,802

[22] Filed: May 12, 1992

[30] Foreign Application Priority Data

May 13, 1991 [GB] United Kingdom ............... 9110332

[51] Int. Cl.⁵ ............................................. G01L 19/12
[52] U.S. Cl. ................................................... 116/267
[58] Field of Search ............... 116/267, 281, 272, 204, 116/283

[56] References Cited

U.S. PATENT DOCUMENTS

| | | | |
|---|---|---|---|
| 3,386,410 | 6/1968 | Barnes, Jr. | 116/272 X |
| 3,411,475 | 1/1968 | Sheff | 116/272 |
| 3,448,716 | 6/1969 | Smith | 116/267 |
| 3,633,612 | 1/1972 | Gross | 116/267 X |
| 3,785,332 | 1/1974 | Silverwater | 116/267 |
| 4,373,528 | 2/1983 | Harle | 116/272 X |
| 4,498,495 | 2/1985 | Worwood et al. | 116/267 X |
| 4,651,670 | 3/1987 | Silverwater | 116/267 X |
| 4,768,460 | 9/1988 | Soon-Fu | 116/272 |
| 4,770,044 | 9/1988 | Ferris | 116/272 X |
| 4,827,095 | 5/1989 | Clark et al. | 200/83 J |
| 4,867,095 | 9/1989 | Shane et al. | 116/267 X |

FOREIGN PATENT DOCUMENTS

| | | |
|---|---|---|
| 0139202 | 5/1985 | European Pat. Off. . |
| 2623513 | 12/1977 | Fed. Rep. of Germany . |
| 3805361 | 9/1988 | Fed. Rep. of Germany . |
| 3908321 | 10/1989 | Fed. Rep. of Germany . |
| 0224670 | 9/1989 | Japan ..................... 116/267 |
| 9004445 | 5/1990 | PCT Int'l Appl. . |
| 0891246 | 3/1962 | United Kingdom ............... 116/267 |
| 2132366 | 7/1984 | United Kingdom . |

Primary Examiner—William A. Cuchlinski, Jr.
Assistant Examiner—John L. Beres
Attorney, Agent, or Firm—Leydig, Voit & Mayer

[57] ABSTRACT

A differential pressure indicator is of the type which uses a magnetically attracted spring loaded pop-up button to indicate when the pressure difference between two fluids reaches a predetermined difference. In order to reduce or eliminate false readings caused by fretting between the button and a housing passage in which it slides the button and the passage have a square cross-section to prevent rotation.

17 Claims, 5 Drawing Sheets

INDICATORS

BACKGROUND TO THE INVENTION

1. Field of the Invention

The invention relates to indicators and more particularly to those indicators in which a member, normally in an inoperative position, moves in a linear path to an operative position when the input representative of a parameter of a system reaches a predetermined level, and produces an output indicative of the predetermined level.

2. Brief Review of the Prior Art

One example of such an indicator is a differential pressure indicator in which the member moves from the inoperative to an operative position when a difference in pressure between fluid from two sources reaches a predetermined level. In such movement, the member can produce a visual/electrical output. An example of a previous proposal for such a differential pressure indicator is shown in FIG. 1 which is a cross-sectional view of a differential pressure indicator.

Referring to FIG. 1, the differential pressure indicator comprises a diaphragm housing 10, a switch housing 11 and an inner support 12 held between the housings 10,11.

The inner support 12 is provided with an annular wall 13 which defines a recess 14 closed at one end and open at the other. A generally cylindrical magnet 15 is received in the recess 14 and is carried by a mounting 16. An end of the mounting 16 adjacent the open end of the recess 14 is connected to a retainer 17 by a screw 18 with an inner edge of an annular diaphragm 19 being clamped between the mounting 16 and the retainer 17. The outer edge of the diaphragm 19 is clamped between an end of a sleeve 20 extending around the open end of the wall 13 and a radially extending disc 21 clamped between the end of the wall 13 and the sleeve 20.

The diaphragm 19 divides the recess 14 into first and second chambers 22,23. The first chamber is connected to a first inlet and a second chamber 23 is connected to a asecond inlet.

A coil spring 24 is arranged around the mounting 16 between a flange 25 at an end of the mounting 16 adjacent the closed end of the recess 14, and the disc 21. In the position shown in FIG. 1, the coil spring 24 is under compression.

The inner support 12 is provided with an annular projection 26 coaxial with the axes of the recess 14 and the magnet 15 but extending in an opposite direction into the switch housing 11. An indicator button 27 having a cylindrical outer surface 28 is mounted for sliding movement in a cylindrical passage 29 in the switch housing 11 and carries at its inner end a generally cylindrical magnet 30 whose end, in the position of the button 27 shown in FIG. 1, extends into the projection of the inner support 12. Also in this position, an open end 31 of the button 27 extends over the projection 26 with a coil spring 32 held under compression between the end of the button 27 and the inner support 12. The button 27 is retained in this position by magnetic attraction between the two magnets 15,30 which are arranged with opposite poles adjacent. Also in this position, the outer end 33 of the button is generally level with the outer end of the passage 29 in the switch housing. This open outer end 33 of the passage 29 is covered by a flexible cover 34.

The switch housing 11 also carries a switch 35 extending generally parallel to spaced from the button 27. The switch 35 is connected via cables 36 to a connector 37.

In use, the first and second chambers 22,23 are connected via their inlets to respective sources of fluid under pressure and thus the fluids are passed to the respective chambers, 22,23. When the difference between the two pressures reaches a predetermined level, set by the characteristics of the magnets 15,30, coil spring 24 and the diaphragm 19, the pressure difference on the diaphragm 19 moves the mounting 16 from the position shown in Figure 1 outwardly of the recess 14. An overtravel stop is provided when the container 17 abuts the diaphragm housing 10. This movement moves the magnet 15 away from the closed end of the recess 14 and so breaks the magnetic attraction between that magnet 15 and the magnet 30 in the switch housing 11. Accordingly, the coil spring 32 associated with the button 27 moves the button 27 outwardly of the passage 29 so that the end 33 of the button 27 projects from the passage 29 into the cover 34. This provides a visual indication that the predetermined pressure difference has been exceeded.

This movement also actuates the switch 35 to pass an electrical signal through the cable 36 to the connector 37 from which it can be taken to an electrical indicator.

The switch housing 11 and the button 27 are commonly made out of aluminium or aluminium alloys. These parts are permanently in contact where the button 27 passes through the passage 29. In general, these materials give adequate performance and reliability characteristics except in a severe environment such as encountered on an aircraft or other mechanism which can induce damaging vibration forces. Under the influence of such forces, the button 27 can be moved in all three planes and can also spin on its axis giving frictional movement on its cylindrical outer surface and on its circular end face. This fretting can cause the formation of debris containing, for example, iron, aluminum and aluminium oxides. The vibration encountered after significant debris has been generated is often increasingly damaging as the debris acts as a grinding grit-type medium.

It has been found that, in such severe environments, the button 27 can be caused to jam on release of the force of the first magnet 15 and so fail to give a proper indication.

SUMMARY OF THE INVENTION

According to the invention, there is provided an indicator mechanism comprising a housing containing a device for receiving an input representative of a parameter of a system, the device including a member normally in an inoperative position but movable in a linear path to an operative position when the input reaches said predetermined level, the member being restrained against rotation relative to the housing.

The following is a more detailed description of an embodiment of the invention, by way of example, reference being made to the accompanying drawings in which:

Figure 1:
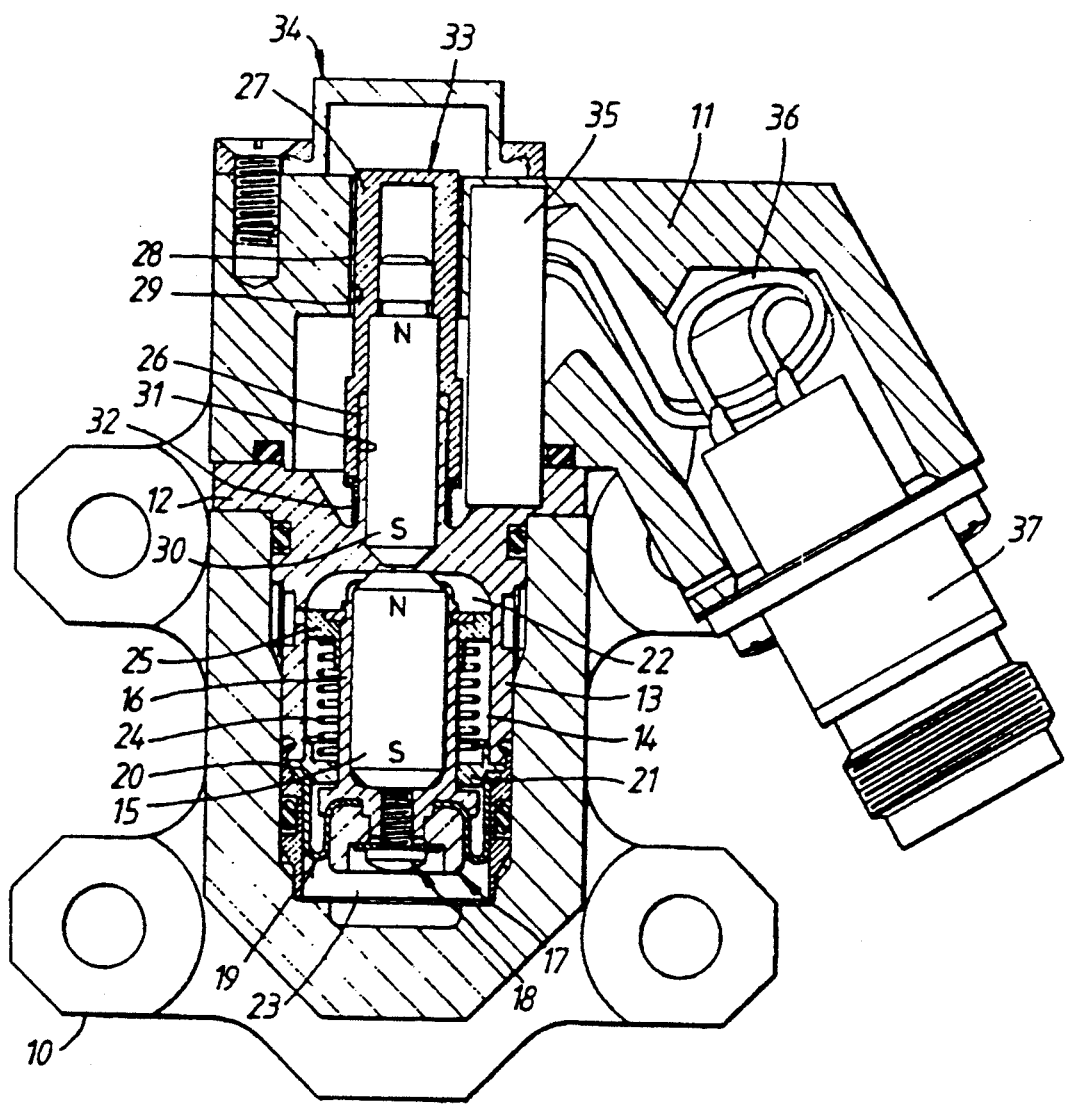
FIG. 1 is a cross-sectional view of a differential pressure indicator in accordance with the prior art.
Figure 2:
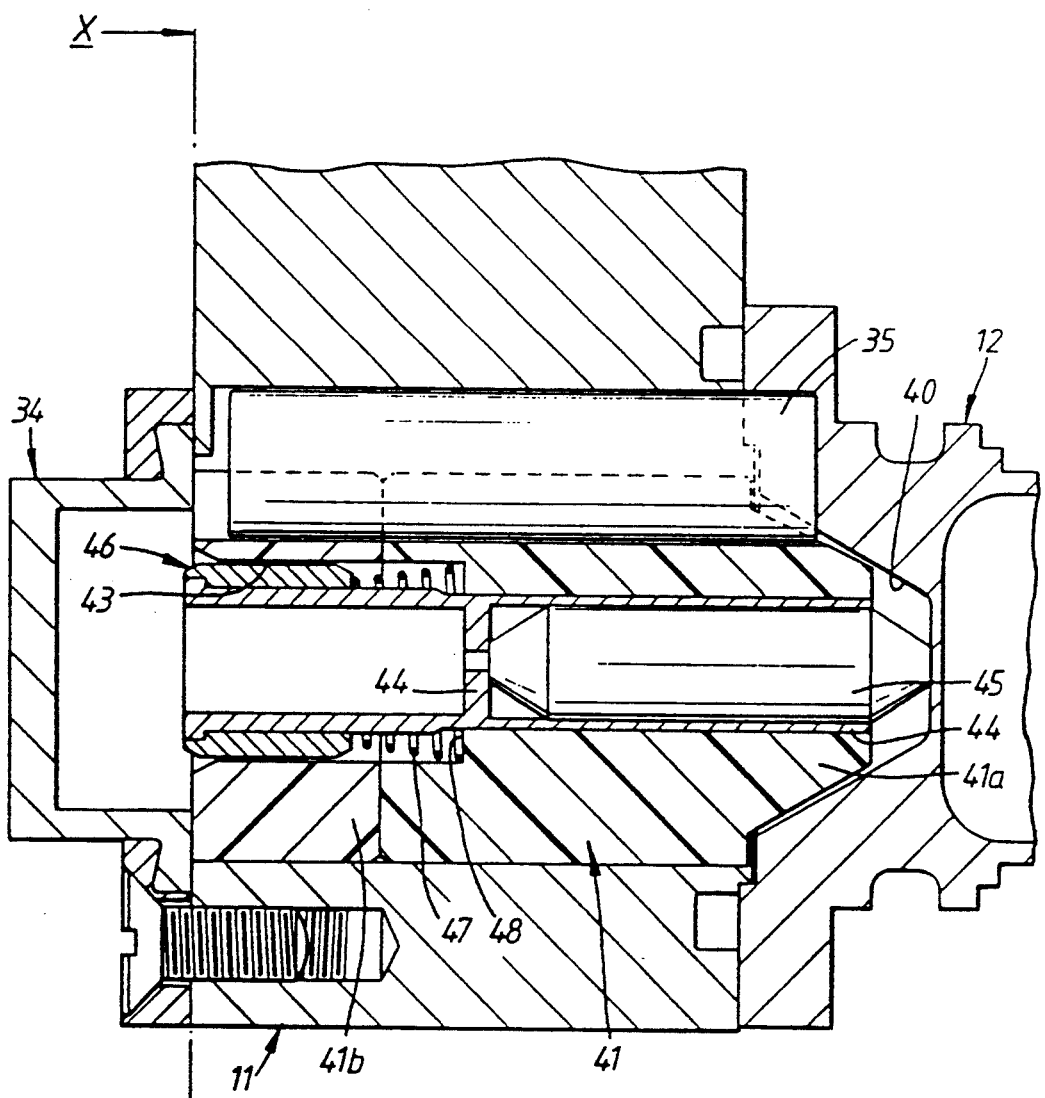
FIG. 2 is a cross-sectional view of an end of a differential pressure indicator similar to the differential pressure indicator shown in FIG. 1 but modified in accordance with an embodiment of the invention.
Figure 3:
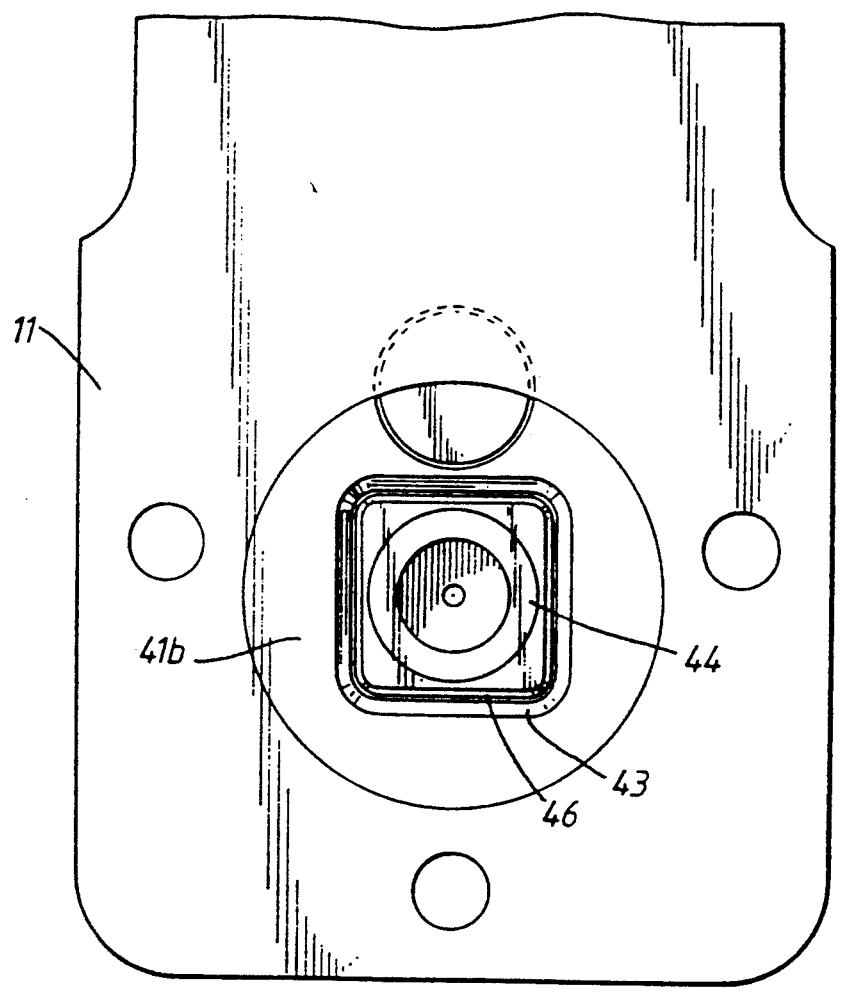
FIG. 3 is a section on the line X—X of FIG. 2 showing a sleeve and collar of the indicator of square cross-section.

In the differential pressure indicator of FIGS. 2 and 3, there is a diaphragm housing 10 (omitted for clarity), a switch housing 11 and an inner support 12 which are substantially identical to the corresponding parts described above with reference to FIG. 1. In addition, the parts contained within the diaphragm housing are substantially identical to the corresponding parts described above with reference to FIG. 1. Further, the switch housing 11 contains a switch 35, a cable 36 and connector 37 which are substantially identical to the corresponding parts described above with reference to FIG. 1. Accordingly, none of these parts will be described in detail.

In the embodiment of the invention shown in FIGS. 2 and 3, the major difference lies in the construction and operation of the button and its associated parts. In the indicator of FIGS. 2 and 3, the inner support 12 is not provided with a projection 26. Rather, the support is provided with a cavity 40. The switch housing 11 carries an annular two-part sleeve 41 whose axis is aligned with the axis of the magnet 15 in the diaphragm housing 10. The sleeve 41 is made from a low friction material which may be a plastics material and, more specifically, may be material sold under the trade mark FLUORSINT which has a coefficient of thermal expansion close to that of aluminium alloy.

The inner part 41a of the sleeve is provided with a central passage 42 of circular cross-section. The outer part 41b of the sleeve 41 is provided with a passage 43 of square cross-section (see FIG. 3).

A button 44 extends through these passages. The button 44 is generally cylindrical with a circular cross-section and is formed from aluminium or aluminium alloy. A magnet 45 is carried by the inner end of the button 44 and, in the position shown in FIG. 2, the end of the magnet 44 is adjacent the end of the cavity 40 and the switch in the inner support 12.

The outer end of the button 44 carries a collar 46 which, as best seen in FIG. 3, has a square cross-section matching the square cross-section of the outer part 41b of the sleeve 41. The collar 46 is firmly connected to the button 44 and a coil spring 47 extends between the inner end of the collar 46 and a step 48 in the inner sleeve portion 41a. In the position shown, the coil spring 47 is in compression.

The exterior of the button 44 may be coated with a low friction but hard-wearing material. This coating may, for example, be a coating of the material sold under the trade name NIFLOR.

In use, the differential pressure indicator described above with reference to FIGS. 2 and 3 operates in generally the same way as the differential pressure indicator described above with reference to FIG. 1. In the position shown in FIG. 2, the button 44 is held in the position shown in that Figure by attraction between the magnet 45 and the magnet 15 in the diaphragm housing 10. When a predetermined differential pressure is reached, the magnet 15 in the diaphragm housing 10 is moved away so breaking the attraction. This allows the button 44 to be moved out of the sleeve 41 so providing a visual indication that the predetermined differential pressure has been reached and also actuating the switch 35.

Since the outer sleeve portion 41a and the collar 46 are of square cross-section, it is not possible for the button 44 to rotate. This prevents or reduces rubbing between the button 44 and the sleeve 41 and so prevents or reduces the fretting that causes debris and thus false indications.

This is also helped by the use of low friction materials for the sleeve 41 and for the coating on the button.

Figure 4:
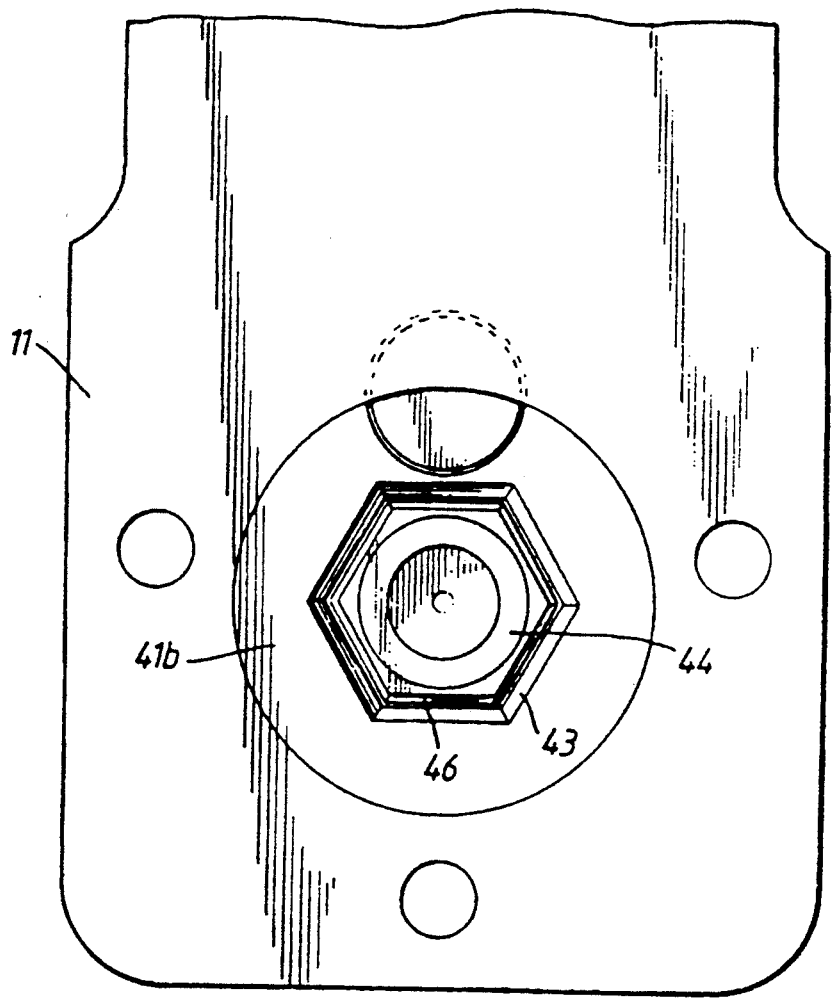
FIG. 4 is a similar view to FIG. 3 but showing a sleeve and collar of the indicator of hexagonal cross-section.
Figure 5:
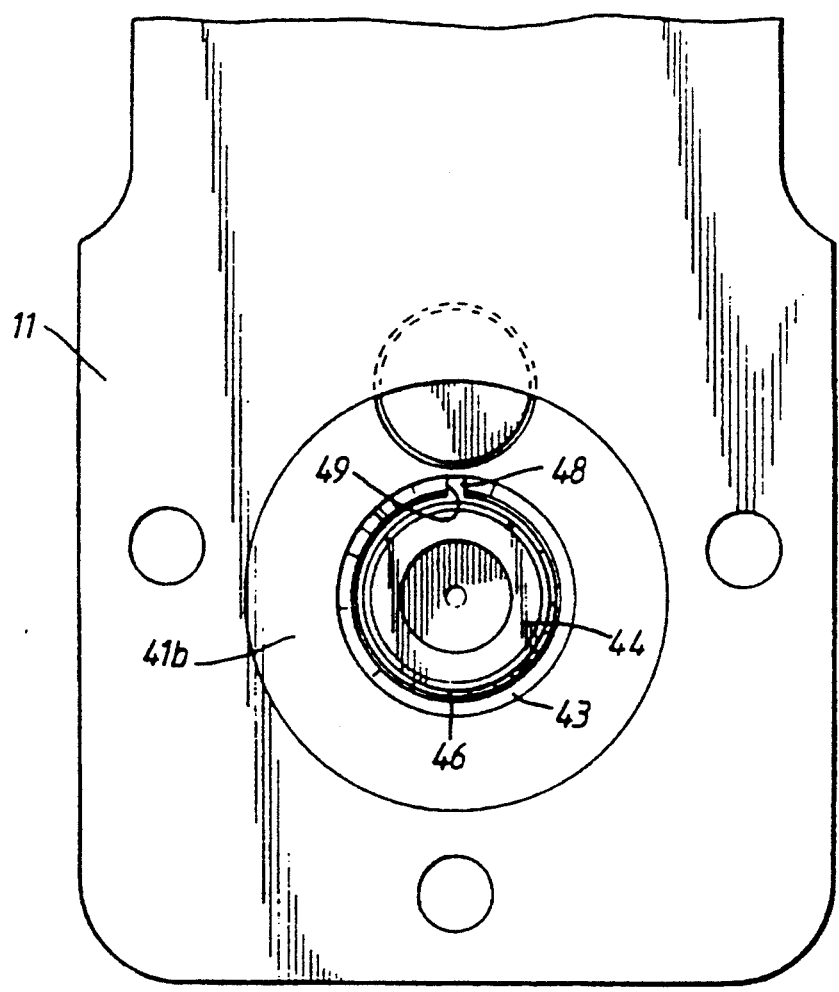
FIG. 5 is a similar view to FIG. 3 and FIG. 4 but showing a sleeve and collar of the indicator provided with a co-operating spline and guide.

Of course, the arrangement described above with reference to FIGS. 2 and 3 can be modified in a number of ways. For example, the cross-section of the collar 46 and the passage 43 need not be square, it could be polygonal or any non-circular cross-section. FIG. 4 shows the collar 46 and the passage 43 of hexagonal cross-section. Further, these parts could be generally circular in cross-section but provided with at least one inter-engaging projection and recess. For example, and with reference to FIG. 5, the collar 46 may include a spline 48 which engages in a guide 49 in the passage 43.

The indicator need not be a differential pressure indicator, it could be a temperature or over-temperature indicator or a flow indicator or an over or under pressure indicator or any other indicator that measures a system parameter either absolutely or relatively.

I claim:

1. A differential pressure indicator comprising:
   a housing;
   an elongated passage formed in the housing;
   an indicator member slidable in the passage between a retracted position and an extended position in which the indicator member projects from the housing;
   a first magnet carried by the indicator member;
   a spring acting on the indicator member and urging the indicator member towards the extended position;
   a second magnet carried by the housing to hold the first magnet and the indicator member in the retracted position against the action of the spring;
   a sensor device sensing the pressure difference between two fluids and acting on the second magnet when the pressure difference reaches a predetermined value to break the magnetic attraction between the first and second magnets whereby the indicator member moves to the extended position under the action of the spring; and
   restraining means acting between the indicator member and the passage in the housing to prevent rotation of the indicator member relative to the housing.

2. An indicator mechanism comprising:
   a housing having an elongated passage;
   an indicator slidably disposed in the passage for linear movement between a first and a second position;
   a first magnet carried by the indicator;
   biasing means for biasing the indicator towards the second position;
   a second magnet separated from the first magnet and slidable in the housing between a first position in which it holds the indicator in its first position against the force of the biasing means by magnetic force between the first and second magnets and a second position in which the biasing means overcomes the magnetic force between the first and second magnets and the indicator moves to its second position;

sensing means disposed in the housing for sensing a parameter of a system external to the indicator mechanism and moving the second magnet between its first and second positions in accordance with the sensed parameter; and restraining means acting between the indicator and the passage in the housing to prevent rotation of the indicator relative to the housing as the indicator moves between its first and second positions.

3. An indicator mechanism according to claim 2 wherein the indicator is of non-circular cross-section and the restraining means comprise a passage in the housing of corresponding non-circular cross-section.

4. An indicator mechanism according to claim 3 wherein the indicator is of square cross-section and the passage is also of square cross-section.

5. An indicator mechanism according to claim 2 wherein the indicator is of generally circular cross-section, and the restraining means comprise a passage in the housing of corresponding circular cross-section to guide the indicator in linear movement and an interengaging projection and recess on the indicator and the passage to restrain the member against rotation relative to the housing.

6. An indicator mechanism according to claim 5 wherein the projection is provided in the indicator and the recess is provided in the passage.

7. An indicator mechanism according to claim 5 wherein the projection is a spline and the recess an elongate groove which receives and guides the spline.

8. An indicator mechanism according to claim 2 wherein the housing includes a passage having a surface formed from a low-friction material for slidably receiving the indicator.

9. An indicator mechanism according to claim 8 wherein the low-friction material is a plastics material.

10. An indicator mechanism according to claim 2 wherein the indicator provides a visual signal when the parameter reaches the predetermined level.

11. An indicator mechanism according to claim 2 including an electrical system, wherein the indicator, on movement between the first and second positions, operates the electrical system to produce an output signal.

12. An indicator mechanism according to claim 2 wherein the biasing means comprises a spring urging the indicator towards the second position.

13. An indicator mechanism according to claim 12 wherein the sensing means moves the second magnet to its second position when a difference in pressure between two fluids exceeds a predetermined value.

14. An indicator mechanism as claimed in claim 2 wherein the housing comprises a sleeve having first and second coaxial bores slidably receiving the indicator, the first bore having a smaller cross-sectional area than the second bore and disposed between the second bore and the second magnet, the biasing means comprising a compression spring disposed in the second bore surrounding the indicator.

15. An indicator mechanism as claimed in claim 14 wherein the indicator comprises a tubular portion and a collar mounted on the tubular portion and engaged with an inner surface of the second bore to prevent rotation of the indicator.

16. An indicator mechanism as claimed in claim 15 wherein the sleeve includes a step formed between the first and second bores, and the spring is compressed between the collar and the step.

17. An indicator mechanism as claimed in claim 2 wherein the housing comprises:

a support separating the first and second magnets and transmitting magnetic force between the first and second magnets, the support forming a cavity having a bottom receiving the first magnet when the indicator is in its second position; and a sleeve spaced from the bottom of the cavity and slidably receiving the indicator.

* * * * *